United States Patent
Tanaka

[11] Patent Number: 5,903,362
[45] Date of Patent: May 11, 1999

[54] FACSIMILE APPARATUS WHICH SELECTS THE SIZE OF A RECORDING SHEET TO BE USED FOR RECORDING A RECEIVED IMAGE

[75] Inventor: Masanori Tanaka, Isehara, Japan

[73] Assignee: Ricoh Company, Ltd., Tokyo, Japan

[21] Appl. No.: 08/537,350

[22] Filed: Oct. 2, 1995

[30] Foreign Application Priority Data

Sep. 30, 1994 [JP] Japan .................................. 6-259732

[51] Int. Cl.⁶ ............................. H04N 1/00; H04N 1/40; H04N 1/32; H04N 1/21
[52] U.S. Cl. .......................... 358/468; 358/449; 358/434; 358/296; 395/106; 395/114; 271/9.05; 271/9.06; 271/9.1
[58] Field of Search .................................... 358/468, 449, 358/296, 434, 435, 436, 438, 439, 440, 437, 476; 395/114, 112, 111, 106, 117; 271/9.01, 9.05, 9.06, 9.1

[56] References Cited

U.S. PATENT DOCUMENTS

| | | | |
|---|---|---|---|
| 4,506,302 | 3/1985 | Kurata | 358/449 |
| 4,789,900 | 12/1988 | Takahashi | 358/257 |
| 4,814,893 | 3/1989 | Katoh | 358/449 |
| 4,855,839 | 8/1989 | Saito | 358/449 |
| 4,941,377 | 7/1990 | Ishihara et al. | 271/9.1 |
| 4,956,723 | 9/1990 | Toda | 358/449 |
| 5,061,967 | 10/1991 | Isobe | 271/9.1 |
| 5,068,743 | 11/1991 | Araki | 358/400 |
| 5,072,306 | 12/1991 | Matsumoto et al. | 358/449 |
| 5,075,783 | 12/1991 | Yoshida et al. | 358/434 |
| 5,140,430 | 8/1992 | Horii et al. | 358/296 |
| 5,247,370 | 9/1993 | Takaoka | 358/440 |
| 5,257,114 | 10/1993 | Yoshida et al. | 358/449 |
| 5,262,851 | 11/1993 | Nakatani et al. | 358/435 |
| 5,343,306 | 8/1994 | Oshita | 358/449 |

Primary Examiner—Kim Yen Vu
Assistant Examiner—Kimberly A. Williams
Attorney, Agent, or Firm—Oblon, Spivak, McClelland, Maier & Neustadt, P.C.

[57] ABSTRACT

A facsimile apparatus equipped with multiple recording sheet feeding devices is provided with a memory for storing information designating the size of a recording sheet to be used for recording a received image. There is a control device for selecting a sheet feeding device from among the multiple sheet feeding devices for recording the received image in accordance with the information stored in the memory and based on the length and width of the received image. The received image is recorded on a sheet of such size as desired and prescribed by a user by a printing mechanism.

8 Claims, 12 Drawing Sheets

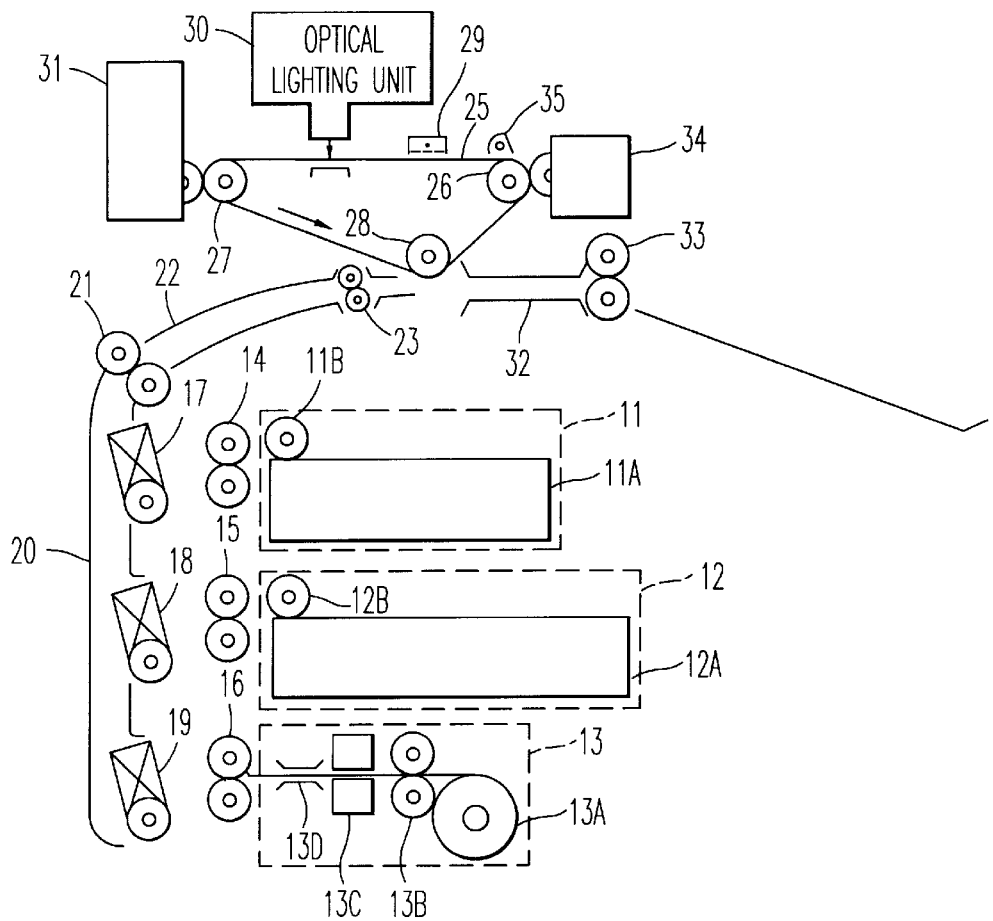
FIG. 2
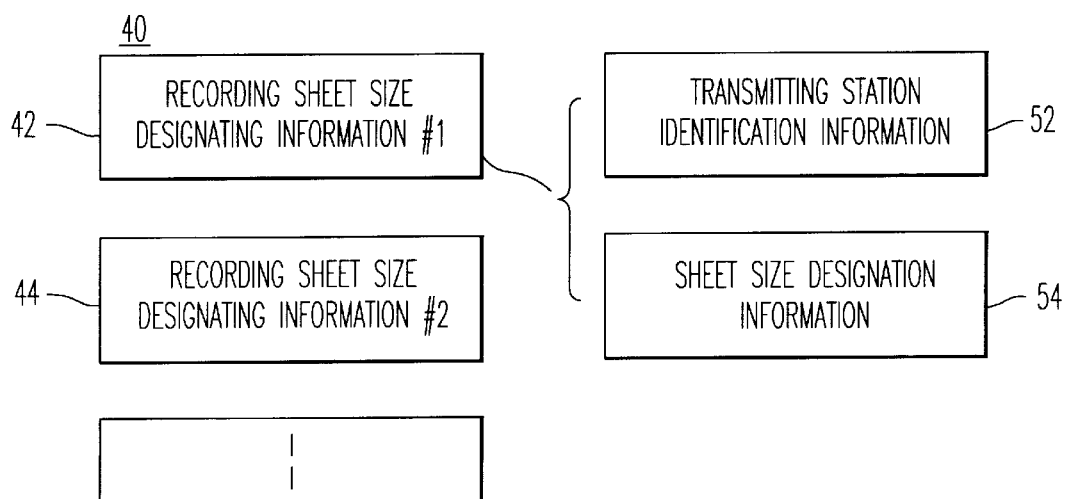
FIG. 3
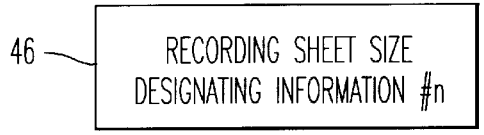

FACSIMILE APPARATUS WHICH SELECTS THE SIZE OF A RECORDING SHEET TO BE USED FOR RECORDING A RECEIVED IMAGE

BACKGROUND OF THE INVENTION

1. Field of the Invention

The present invention relates to a facsimile apparatus equipped with multiple recording sheet feeding devices and more particularly to the manner of designating the size of a recording sheet to be used to record a received image and selecting an appropriate sheet feeding device from among the multiple sheet feeding devices.

2. Discussion of the Background

In general, a facsimile apparatus is so made to transmit A4 size documents (a size corresponding to a letter size in the US) which is the most widely used size. However, there exists a need to transmit documents of other sizes such as A5, B5, B4 and A3 sizes, and some facsimile apparatuses are capable of transmitting and recording such sizes in addition to the A4 size. Further, some apparatuses are provided with a device for feeding a rolled sheet having an A4 width so that an image of continuous length can be recorded. In such an apparatus having multiple recording sheet feeding devices, however, there exists a problem in that it is difficult to determine which one of such multiple recording sheet feeding devices is the most appropriate one to be used for recording a received image.

SUMMARY OF THE INVENTION

The present invention has been made in view of this problem, and an object of the present invention is to provide a novel facsimile apparatus wherein the most appropriate sheet feeding device is selected from among multiple recording sheet feeding devices for recording a received image.

In order to achieve the above-mentioned object, a facsimile apparatus which stores a received image temporarily in a system memory and is equipped with an image recording device for recording the received image is provided with a device for feeding a cut sheet to the image recording device and a device for feeding a rolled sheet to the image recording device. The device includes a memory device for storing information prescribed by a user designating the size of a recording sheet to be used for recording an image received from each transmitting facsimile station, and a control device for selecting, when image information is received, a sheet feeding device from among the cut sheet feeding device and rolled sheet feeding device in accordance with the information prescribed by a user and stored in the memory device. A sheet is fed from the selected sheet feeding device to the image recording device for recording thereupon the received image.

Alternatively, instead of basing the decision of the paper source which is to be used for the recorded image on the information stored in the memory device, the decision may be based on both the information stored in the memory device and the size of the received image which is defined by the height and width of the image.

Further, a facsimile apparatus which stores a received image temporarily in a system memory and is equipped with an image recording device for recording the received image is provided with a device for feeding a cut sheet to the image recording device and a device for feeding a rolled sheet to the image recording device. The device includes a memory device for storing information prescribed by a user specifying the relationship between a length and width of a received image and a size of a recording sheet to be used to record thereupon the received image, and a control device for selecting, when image information is received, a sheet feeding device from among the cut sheet feeding device and rolled sheet feeding device in accordance with the information prescribed by a user and stored in the memory device and based upon the length and width of the received image. A sheet is fed from the selected sheet feeding device to the image recording device for recording thereupon the received image.

As described above, a facsimile apparatus according to the present invention selects one of the recording sheet feeding devices in accordance with the information, which has been prescribed beforehand by a user, designating the size of a recording sheet to be used for recording an image received from each transmitting station. Therefore, the user can record an image received from each transmitting station on a recording sheet of such size as desired by the user.

Further, as described above, a facsimile apparatus according to the present invention selects one of the recording sheet feeding devices in accordance with the information, which has been prescribed beforehand by a user, specifying the relationship between a size of a received image and a size of a recording sheet to be used to record the received image thereupon. Therefore, the user can record an image received on a recording sheet of such size as desired by the user.

BRIEF DESCRIPTION OF THE DRAWINGS

The above and other objects, features and advantages of the present invention will become more apparent from the following detailed description when read in conjunction with the accompanying drawings, wherein:

FIG. 2 is a schematic drawing showing an example of a sheet feeding device and an image recording device of a plotter;

FIG. 3 is a diagram showing an example of an information table designating the size of a recording sheet to be used for each transmitting station;

DESCRIPTION OF THE PREFERRED EMBODIMENTS

Figure 1:
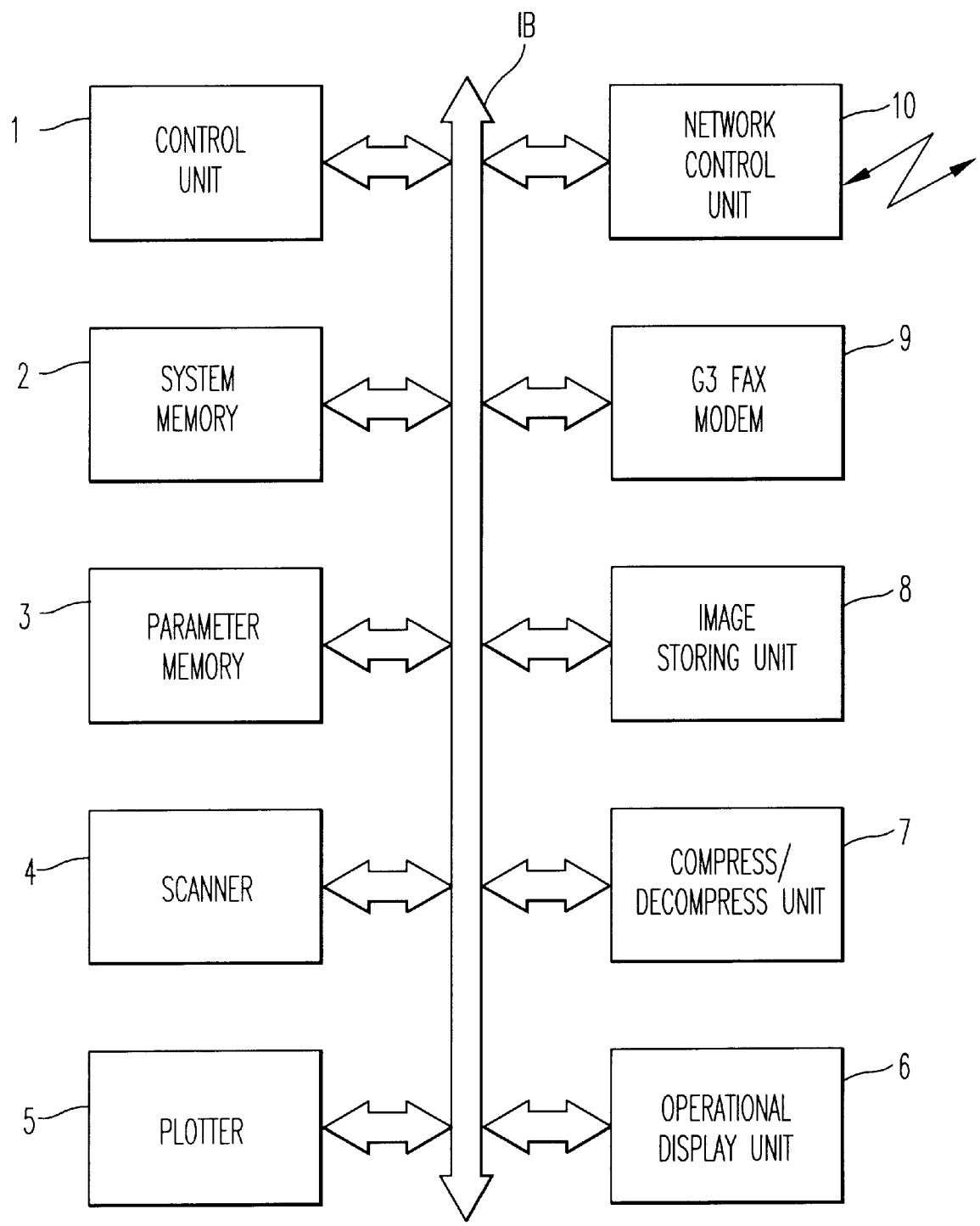
FIG. 1 is a block diagram showing a G3 facsimile apparatus in accordance with the present invention.

Referring now to the drawings, wherein like reference numbers designate identical or corresponding parts throughout the several views, and more particularly to FIG. 1 thereof, there is illustrated a block diagram of a G3 facsimile apparatus in accordance with the present invention. In FIG. 1, a control unit 1 performs a control of various parts of the facsimile apparatus as well as a processing of a facsimile transmission protocol. A system memory 2 stores programs for processing various controls by the control unit 1 and various data necessary for executing such programs and also provides a work area for the control unit 1. A parameter memory 3 stores various types of information peculiar to this facsimile apparatus, such as, for example, conditions for recording a received image (prohibiting reducing the size of a received image, giving preference to a cut sheet over a rolled sheet for recording and so on), which is registered by a user of the apparatus through an appropriate operation such as input by a keypad of an operational display unit 6. A scanner 4 reads an original document with a prescribed resolution, a plotter or printer 5 records or prints the received image with a prescribed resolution and is equipped with multiple sheet feeding devices for feeding a recording sheet to record thereupon the received image. The operational display unit 6 is a panel for operating the apparatus and is equipped with various operational keys and displays. A compressing and decompressing unit 7 is for compressing and decompressing an image signal, and an image storing unit 8 is for storing image information which is compressed. The image storing unit 8 may be constructed using a RAM or hard disk, for example. A G3 facsimile modem 9 is a modem for communicating with a G3 facsimile apparatus and is equipped with a low speed modem function (V.21 modem) for exchanging communication protocol signals and a high speed modem function (V.33 modem, V.29 modem, V.27ter modem and so on) for exchanging primarily image information. A network control unit 10 is for connecting the apparatus with a public telephone network and is equipped with an automatic call originating and receiving function. The control unit 1, the system memory 2, the parameter memory 3, the scanner 4, the plotter 5, the operational display unit 6, the compressing and decompressing unit 7, the image storing unit 8, the G3 facsimile modem 9 and the network control unit 10 are connected to an internal bus IB and data exchange among these units are made through this internal bus IB. Data exchange between the network control unit 10 and the G3 facsimile modem 9 is carried out directly.

FIG. 2 is a schematic drawing showing an example of a sheet feeding device and an image recording device of the plotter 5. As illustrated, three sheet feeding devices are provided in the plotter 5; an A4 size cut sheet feeding device 11 for feeding an A4 size cut sheet, a B4 size cut sheet feeding device 12 for feeding a B4 size cut sheet, and an A4 width rolled sheet feeding device 13 for feeding an A4 width rolled sheet. The A4 size cut sheet feeding device 11 is provided with an A4 size cut sheet feeding tray 11a in which A4 size cut sheets are stacked and an A4 size cut sheet feeding roller 11b which separates a sheet placed on top of the stack for feeding out to an image recording device described below. The B4 size cut sheet feeding device 12 is provided with a B4 size cut sheet feeding tray 12a in which B4 size cut sheets are stacked and a B4 size cut sheet feeding roller 12b for separating a B4 sheet placed on top of the stack for feeding out to the image recording device described below. The A4 width rolled paper feeding device 13 is equipped with a pair of a feeding roller 13b for feeding an A4 width rolled sheet 13a, a cutter 13c for cutting the A4 width rolled sheet and a guide plates 13d for guiding the A4 width rolled sheet along the direction of sheet travel.

An A4 size cut sheet fed out from the A4 size cut sheet feeding device 11, a B4 size cut sheet fed out from the B4 size cut sheet feeding device 12, and an A4 width rolled sheet fed out from the A4 width rolled sheet feeding device 13 (hereinafter referred to simply as sheets) are fed along the direction of travel by pairs of feeding rollers 14, 15 and 16, respectively, and guided to a sheet traveling path 20 through sheet deflectors 17, 18 and 19, respectively. A sheet passed through the sheet traveling path 20 is guided into a guide 22 by a pair of a feeding rollers 21 and fed out to a transfer unit of the image recording device by a pair of a registration rollers 23 in such a timing that the leading edge of the sheet is synchronized with the leading edge of a toner image on a photoreceptor of the image recording device.

The image recording device is an electrophotographic type image recording device well known in the industry and is made of an endless belt-type photoreceptor 25, rollers 26, 27 and 28 for driving the photoreceptor 25, a charger 29 for charging the surface of the photoreceptor uniformly with an electrostatic charge, and an optical lighting unit 30 for writing an optical image of an image to be recorded on the surface of the photoreceptor 25 to form its latent image thereupon. The optical lighting unit may include a laser and rotating polygonal mirror, for example. There is a developing unit 31 for developing the latent image formed on the photoreceptor 25, a sheet guide 32 for guiding a sheet on which a toner image has been transferred, a pair of fixing rollers 33 for fixing the toner image formed on a sheet onto the sheet by applying a heat, a cleaning unit for removing residual toners on the photoreceptor 25 and a discharging lamp 35 for eliminating a residual charge on the photoreceptor 25.

When an A4 size cut sheet is designated to be used for recording an image, the plotter 5 moves the deflector 17 to the position illustrated by a dotted line and feeds an A4 size cut sheet from the A4 size cut sheet feeding device 11 to record the image thereupon. When a B4 size cut sheet is designated, the plotter 5 moves the deflector 18 to the position illustrated by a dotted line and feeds a B4 size cut sheet from the B4 size cut sheet feeding device to record the image thereupon. Likewise, when an A4 width rolled paper is designated, the plotter 5 moves the deflector 19 to the position illustrated by a dotted line and feeds an A4 width rolled sheet 13a, which has been cut to the length as required from the A4 width rolled sheet feeding device 13 to record the image thereupon.

It is of course possible to place any of these three sheet feeding devices in any position. For example, the A4 size cut sheet feeding device can be placed in the position of the B4 size cut sheet feeding device in FIG. 2. Further, a B4 width rolled sheet feeding device for feeding a B4 width rolled sheet (not shown in the drawing) may be installed. In each of these sheet feeding devices is provided a size indicating switch (not shown in the drawing) for informing a control unit (not shown in the drawing) of the plotter 5 of the size of a sheet provided in each sheet feeding device, and the control unit of the plotter 5 memorizes the size of a sheet provided in each sheet feeding device and the position of each sheet feeding device.

Further, in the parameter memory 3 is stored an information table 40 as shown in FIG. 3 designating the size of a recording sheet to be used for recording an image received from each transmitting station. The table 40 contains entries 42–46 for different transmitting stations. Multiple information is included for each entry in this table, which includes information identifying the transmitting station and information designating the sheet size to be used for recording an image received from the same station. Entry 42 of table 40 contains fields 52 and 54. The other entries of table 40 contain similar information as 52 and 54 (not illustrated), for example input using the operational display unit 6 or by another appropriate operation. In this embodiment, since sizes of a sheet which can be provided in the plotter 5 are an A4 cut sheet, a B4 cut sheet and an A4 width rolled sheet, the sheet size to be designated to be used for each transmitting station becomes one these three sizes.

Figure 4:
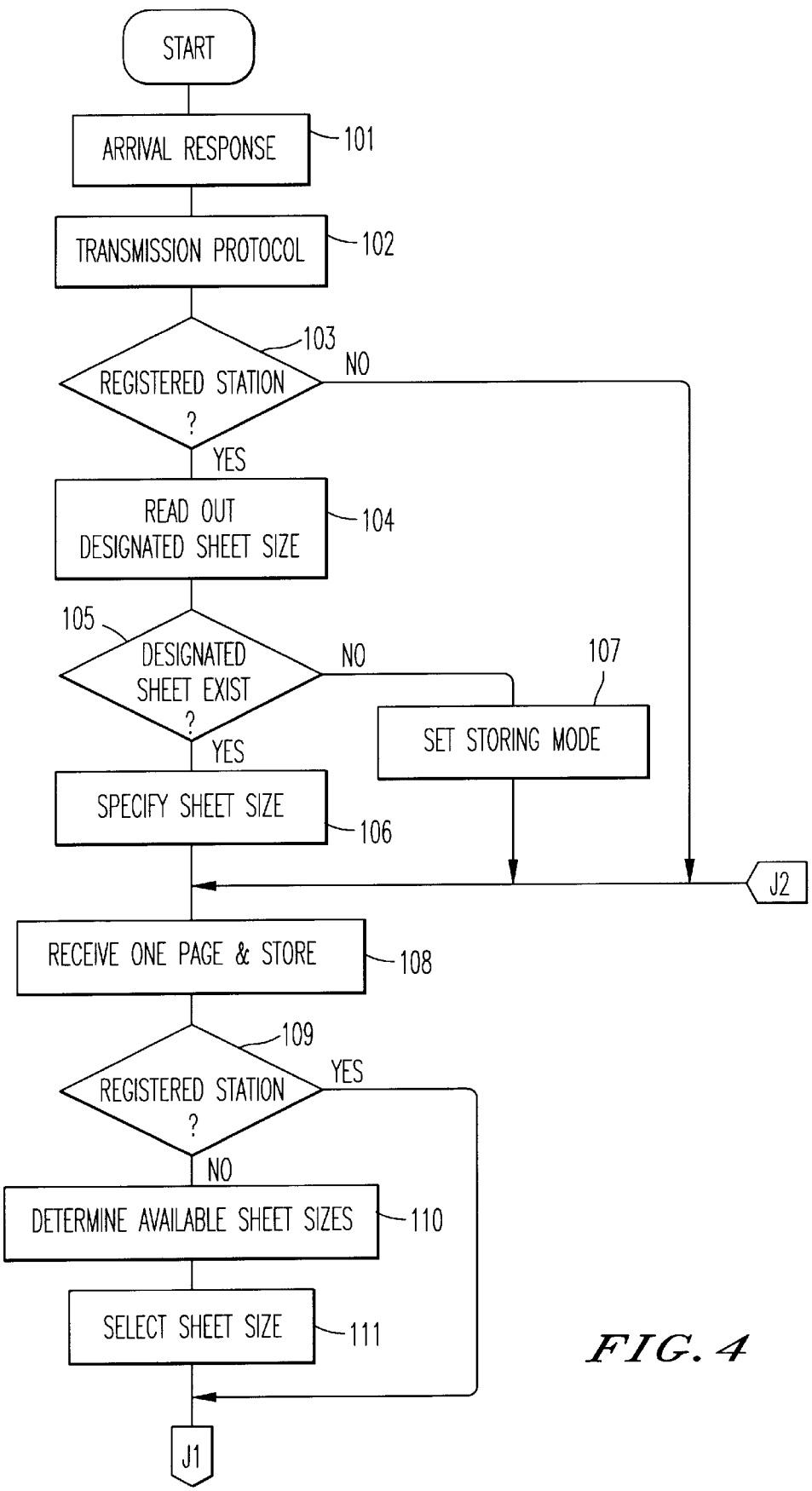
FIGS. 4 and 5 illustrate a flowchart showing an example of an operation performed when receiving an image.
Figure 5:
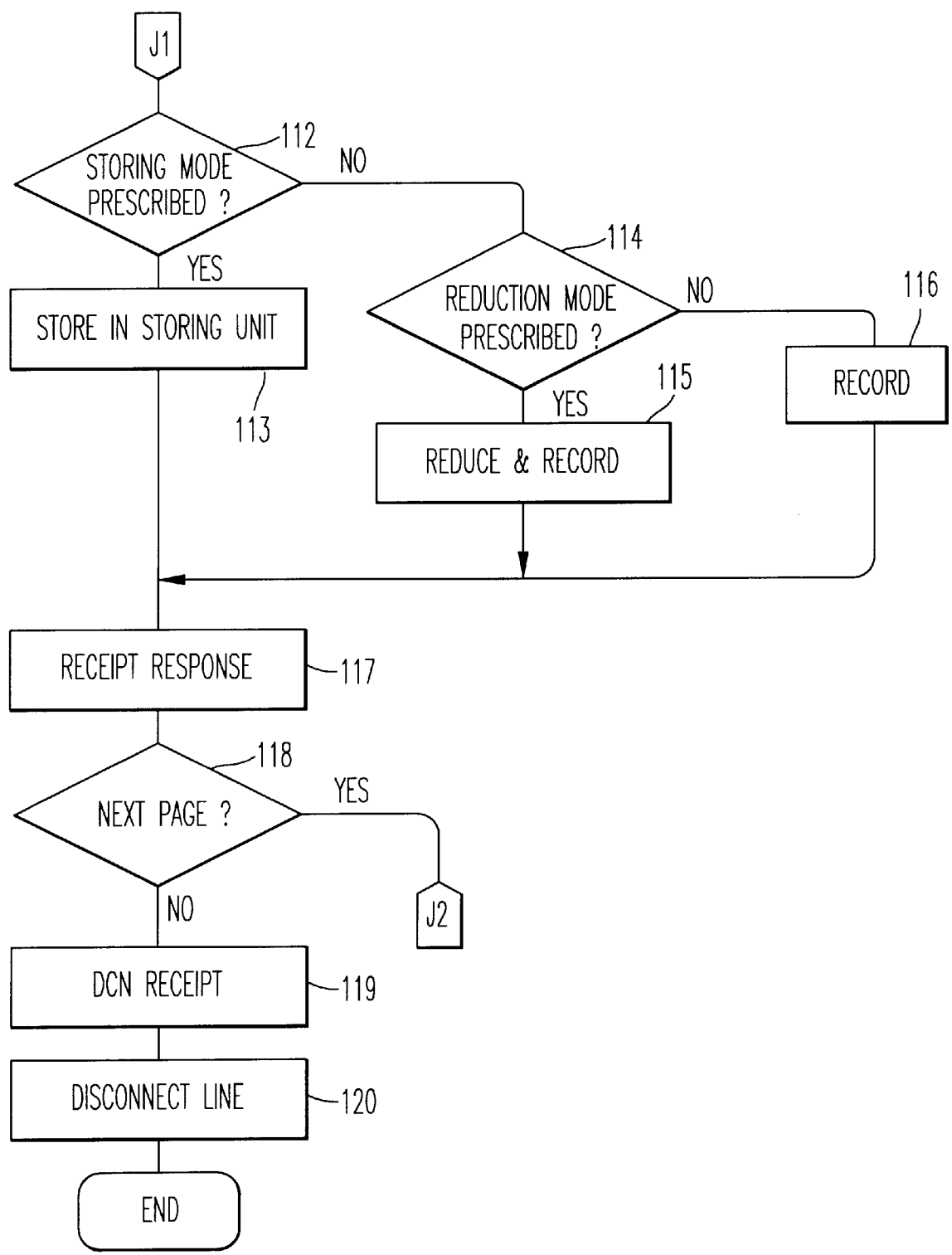

Next, an operation of the apparatus at the time of receiving image information is explained referring to FIG. 4 and FIG. 5. After a ringing is detected, an arrival response is made (101) and a protocol processing prescribed to be made prior to a transmission is performed (102). When transmitting station identification information is received, it is checked if such transmitting station identification information is in the information table designating the sheet size to be used for each transmitting station (103), and if YES, the information designating the sheet size to be used is read out (104). Step 105 checks if a sheet of such size exists in the A4 size cut sheet feeding device 11, or in the B4 size cut sheet size feeding device 12, or in the A4 width rolled sheet feeding device 13. If the result of checking in step 105 is YES, such size is prescribed to be used (106), and if the result of step 105 is NO, a storing mode for storing the received image is set (107). After receiving the image information for one page from the transmitting station, such image information is stored temporarily in a buffer in the system memory 2 (108) and it is checked if the transmitting station is one of the stations registered in the information table designating the sheet size to be used for each transmitting station (109). If the result of step 109 is NO, it is checked in step 110 if paper exists in each of the A4 size cut sheet feeding device 11, the B4 size cut sheet feeding device 12 and the A4 width rolled sheet feeding device 13 of the plotter 5 which determines the available sheet sizes (110) for the plotter 5 to feed. A process of selecting a recording sheet (111) is then executed. Flow then proceeds to J1 illustrated in FIG. 5.

When the storing mode is prescribed in the recording sheet selection process (the result of step 112 is YES), the received image which has been stored temporarily in the system memory 2 is stored in the image storing unit 8 (113). In case the result of step 112 is NO, it is checked if a reduction mode is prescribed (114), and if the result of step 114 is YES, a process of recording the received image on the selected recording sheet after reduction of the size of the image is performed (115). If the result of step 114 is NO, the received image is recorded on the recording sheet as selected (116). After completing the process for the received page as described above, the receiving station transmits to the transmitting station a response signal informing the result of the reception (117) and checks if there is a notification of a next page from the transmitting station (118). If the result of step 118 is YES, the operation returns to step 108 and performs the process for the next page. If the result of step 118 is NO, the receiving station receives a disconnecting (DAN) signal (119) and disconnects the line (120), thus terminating the operation of receiving an image.

Next, an example of a process of selecting a recording sheet (111) is explained referring to FIGS. 6–10. First, it is checked if the width of a received image is a B4 width (201), and if the result is YES, it is checked if a B4 width rolled sheet is in the plotter 5 (202). If the result of step 202 is YES, it is checked if a B4 size cut sheet is in the plotter 5 (203). If the result of step 203 is YES, it is checked if a cut sheet preference mode is prescribed (204). If the result of step 204 is YES, it is checked if the number of the lines of the received image is bigger than the number for a B4 size cut sheet (205). If the result of step 205 is NO, it is the case where the received image can be recorded on a B4 size cut sheet with the same magnification, and therefore a B4 size cut sheet is designated as the recording sheet (206). In case the result of step 205 is YES, it is the case where the received image has a continuous length and cannot be recorded in a manner the user has prescribed. Therefore, a storing mode is set (207). In case the result of step 204 is NO, a B4 width rolled sheet is designated as the recording sheet (208).

Figure 7:
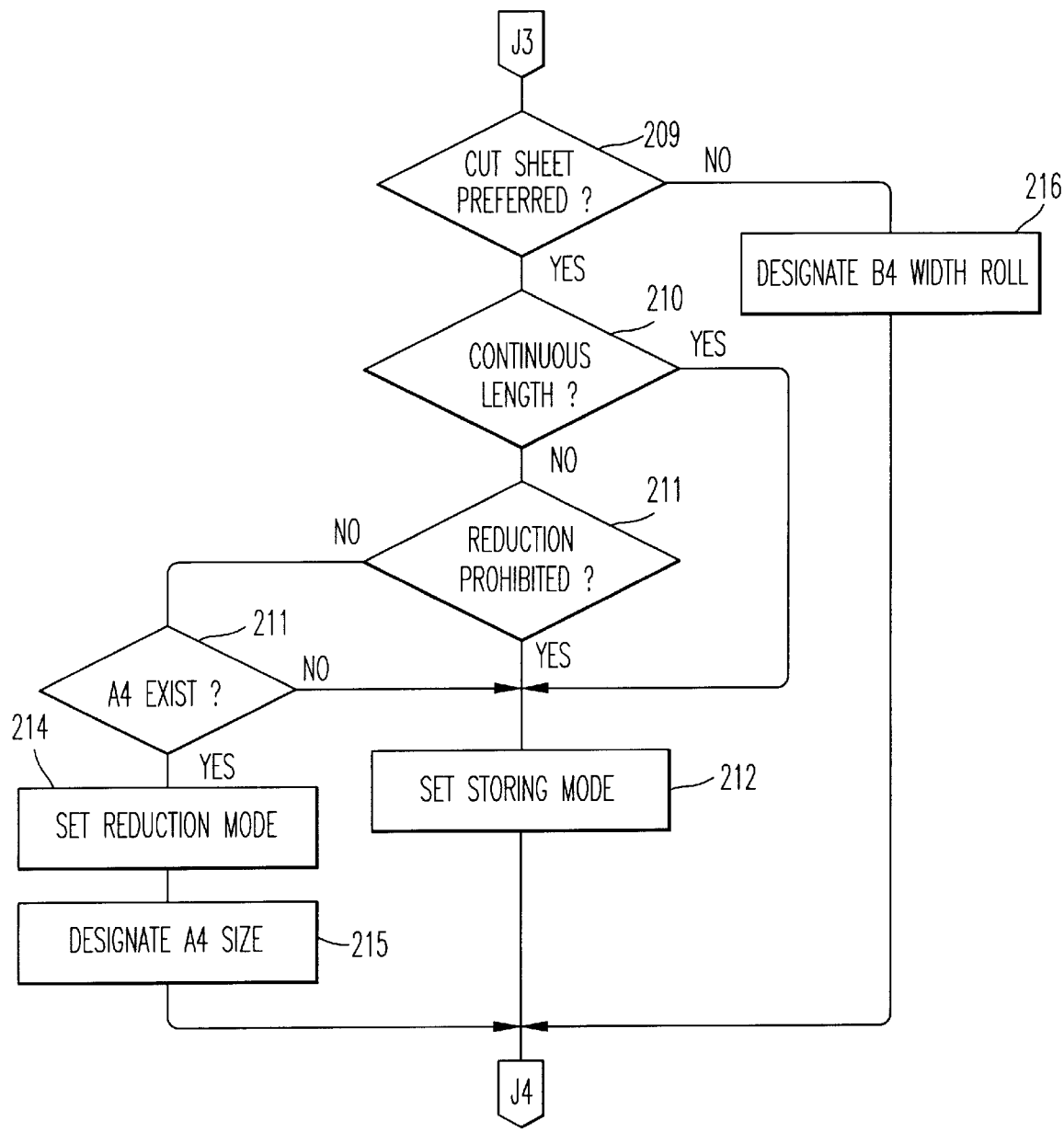

In case the result of step 203 is NO, flow proceeds to J3 illustrated FIG. 7. In FIG. 7, it is checked if a cut sheet preference mode is prescribed (209). In case the result of step 209 is YES, it is checked if the number of the lines of the received image is bigger than the one of a B4 size cut sheet (210). If the result of step 210 is NO, it is checked if a reduction prohibiting mode is prescribed (211). If the result of step 211 is YES, it is the case where the received image cannot be recorded in a manner prescribed by the user and therefore a storing mode is set (212). If the result of step 211 is NO, it is checked if an A4 size cut sheet is in the plotter 5 (213). If the result of step 213 is NO, it is the case where the received image cannot be recorded in a manner prescribed by the user, and therefore a storing mode is set (212). In case the result of step 213 is YES, a reduction mode is set (214) and an A4 size cut sheet is designated (215). In case the result of step 209 is NO, a B4 width rolled sheet is designated as the recording sheet (216).

Figure 6:
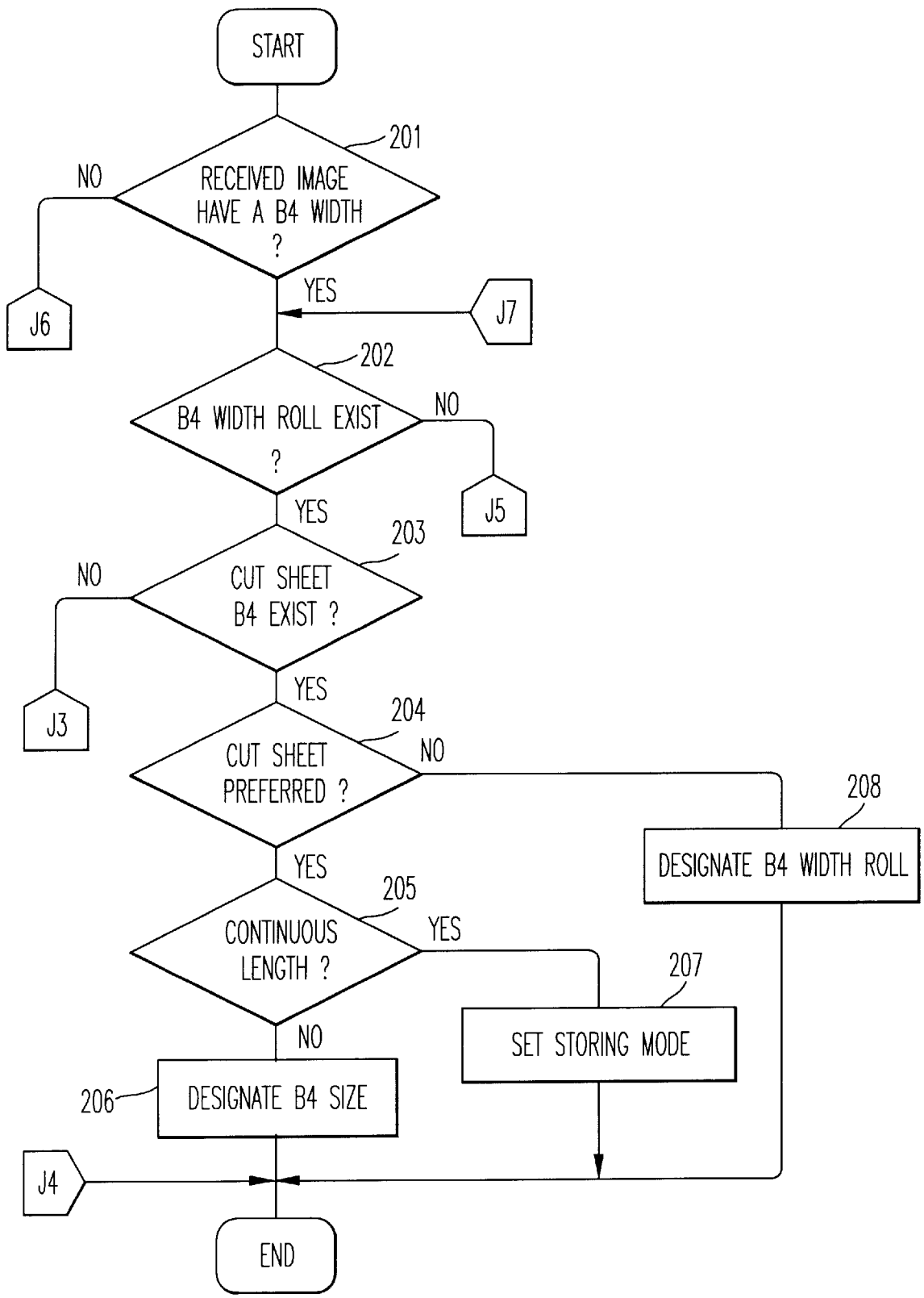
FIGS. 6–10 illustrate a flowchart showing an example of an operation of selecting a recording sheet.
Figure 8:
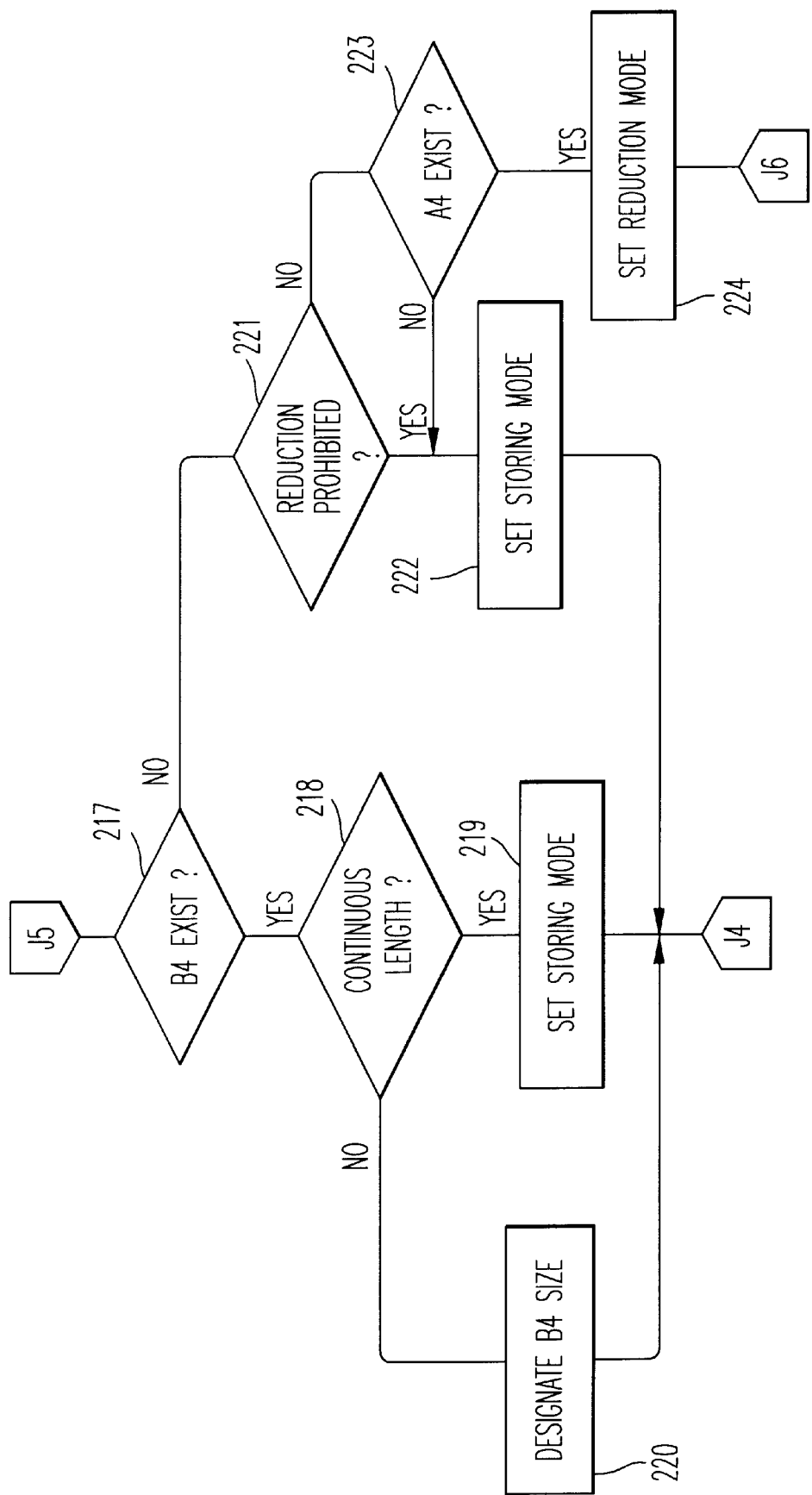

In case the result of step 202 in FIG. 6 is NO, flow proceeds to J5 illustrated in FIG. 8. In FIG. 8, it is checked if a B4 width rolled sheet is in the plotter 5 (217). If the result of step 217 is YES, it is checked if the number of lines of the received image is bigger than the lines of a B4 cut size sheet (218). If the result of step 218 is YES, it is the case where the received image cannot be recorded in a manner prescribed by the users and therefore a storing mode is set (219). In case the result of step 218 is NO, a B4 size cut sheet is designated as the recording sheet (220). In case the result of step 217 is NO, it is checked if a reduction prohibiting mode is prescribed (221). If the result of step 221 is YES, it is the case where the received image cannot be recorded in a manner prescribed by the user and therefore a storing mode is set (222). In case the result of step 221 is NO, it is checked if an A4 size cut sheet is in the plotter 5 (223). If the result of step 223 is YES, a reduction mode is set (224) and moves to a process J6 for A4 size cut sheets, as described later with respect to FIG. 9. In case the result of step 223 is NO, it is the case where the received image cannot be recorded in a manner prescribed by the users and therefore a storing mode is set (222).

Figure 9:
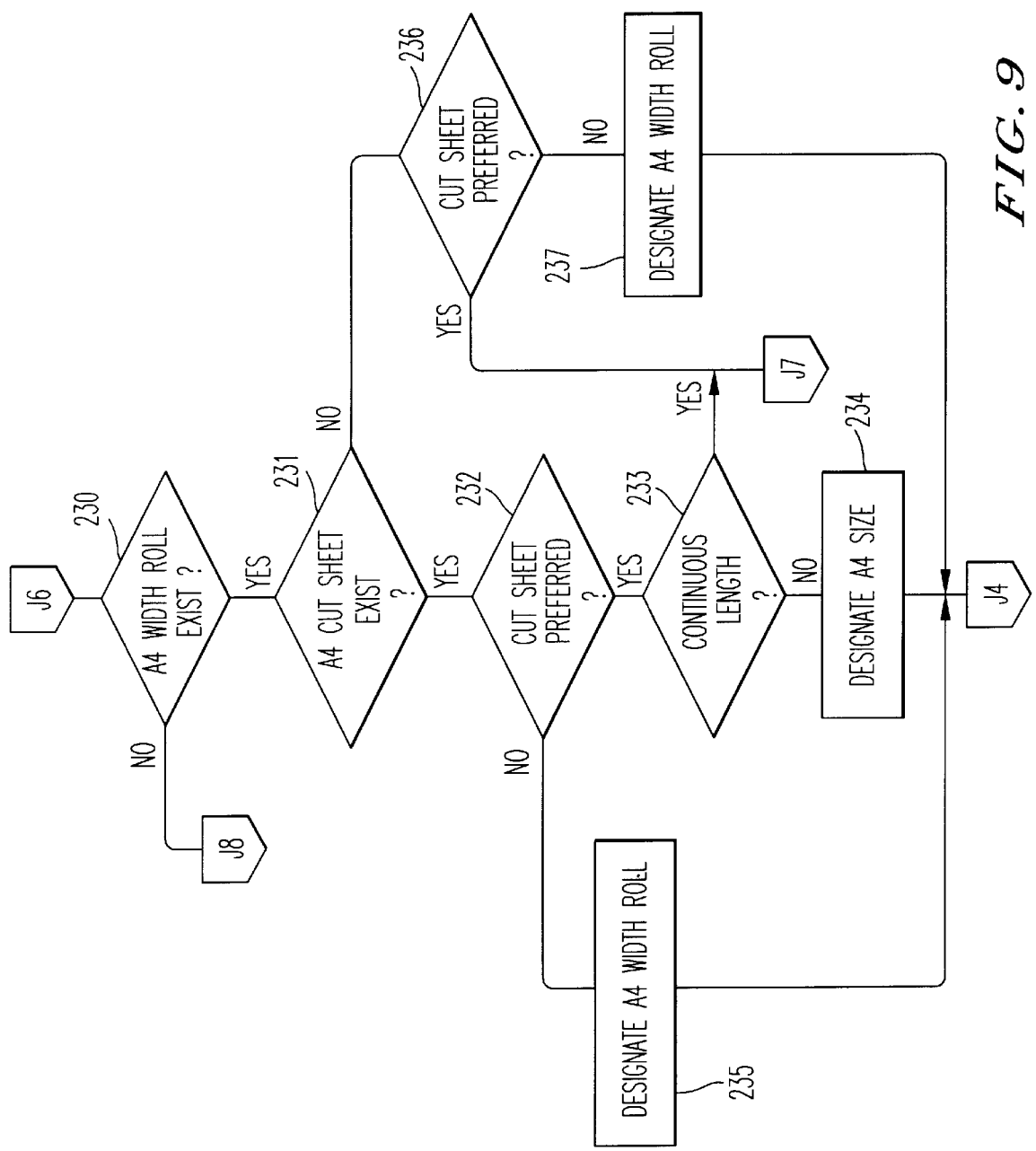

In case the width of the received image is A4 and the result of step 201 of FIG. 6 is NO, flow proceeds to J6 illustrated in FIG. 9. In FIG. 9, it is checked if an A4 size rolled sheet is in the plotter 5 (230). If the result of step 230 is YES, it is checked if an A4 size cut sheet is in the plotter 5 (231). If the result of step 231 is YES, it is checked if a cut sheet preference mode is prescribed (232). If the result of step 232 is YES, it is checked if the number of lines of the received image is bigger than the number of lines of an A4 size cut sheet (233). If the result of step 233 is NO, it is the case where the received image can be recorded on an A4 size cut sheet with the same magnification and therefore, the A4 size cut sheet is designated as the recording sheet (234). In case the result of step 233 is YES, the process moves to step 202 of FIG. 6 which is a process for a B4 width. If a B4 size cut sheet is in the plotter 5 and the received image fits in a B4 size, the received image is recorded on a B4 size cut sheet. In case the result of step 231 is NO, it is checked if a cut sheet preference mode is prescribed (236). If the result of step 236 is NO, an A4 width rolled sheet is designated as the recording sheet (237). If the result of step 236 is YES, the process moves to step 202 of FIG. 6. If the B4 size cut sheet is in the plotter 5 and the received image fits in a B4 size, the received image is recorded on a B4 size cut sheet.

Figure 10:
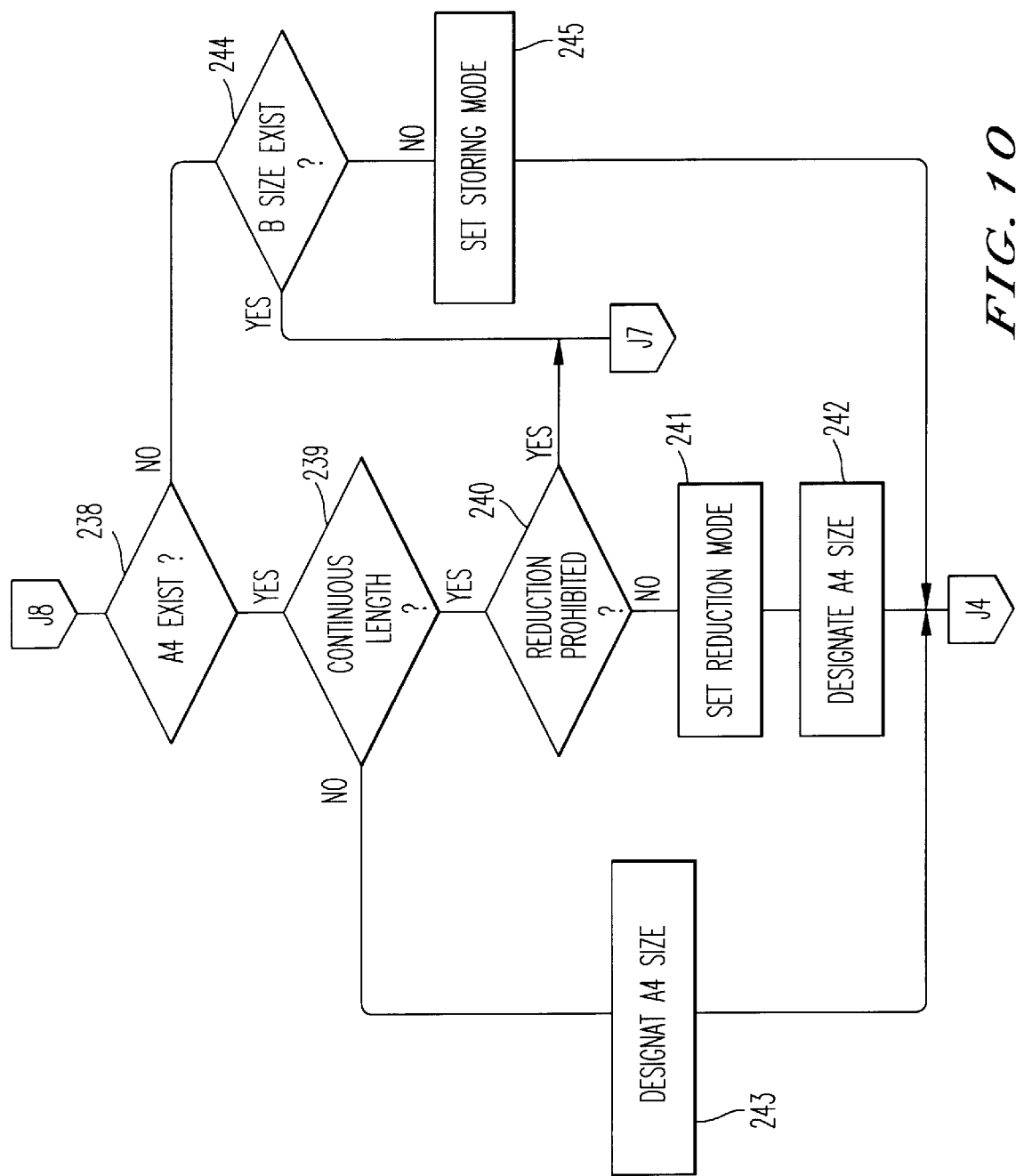

In case the result of step 230 of FIG. 9 is NO, flow proceeds to J8 of FIG. 10. In FIG. 10, it is checked if an A4 size cut sheet is in the plotter 5 (238). If the result of step 238 is YES, it is checked if the number of lines of the received image is bigger than the number of lines of an A4 size cut sheet (239). If the result of step 239 is YES, it is checked if a reduction prohibiting mode is prescribed (240). If the result of step 240 is YES, the process moves to step 202 of FIG. 6 which is a process for a B4 width. If a B4 size cut sheet is in the plotter 5 and the received image fits in a B4 size, the received image is recorded on a B4 size cut sheet. In case the result of step 240 is NO, a reduction mode is set (241) and an A4 size cut sheet is designated as the recording sheet (242). In case the result of step 239 is NO, an A4 size cut sheet is designated as the recording sheet (243). If the result of step 238 is NO, it is checked if a B4 size cut sheet or a B4 width rolled sheet is in the plotter 5 (244). If the result of step 244 is YES, the process moves to step 202. If a B4 size cut sheet is in the plotter 5 and the received image fits in a B4 size, the received image is recorded on a B4 size cut sheet. If the result of step 244 is NO, it is the case where the received image cannot be recorded in a manner prescribed by the user and therefore a storing mode is set (245).

Figure 11:
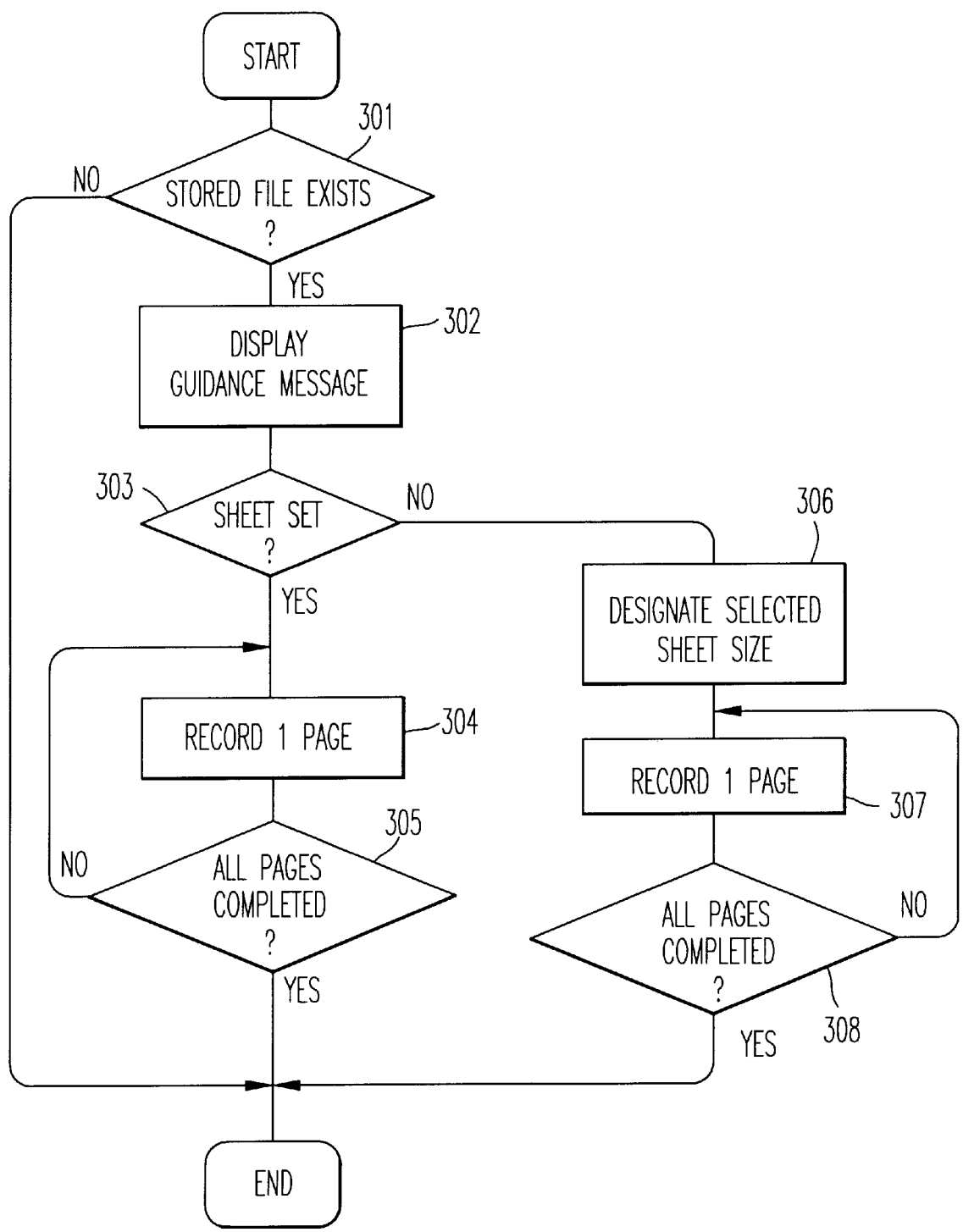
FIG. 11 is a flowchart showing an example of an operation of recording a stored image.

Next, an example of an operation of requesting a user to record an image stored in the image storing unit 8 is explained referring to FIG. 11. First, it is checked if any file containing a received image is stored in the image storing unit 8 (301). If the result of step 301 is YES, the size of such stored image and a guidance message requesting to select between the choices of inserting a recording sheet (of such size suitable for recording the stored image) in the plotter 5 for recording such stored image and selecting a recording sheet from among the sheets currently in the plotter 5 for recording the stored image, is displayed by the operational display unit 6 (302). If a recording sheet is set in a manual feed tray of the plotter by a user and detected by a conventional paper detection sensor (not illustrated) (the result of step 303 is YES), the received image of the selected file in the image storing unit 8 is printed out page by page (304 to 305 to 304). In case the user selected a recording sheet from among those currently in the plotter 5 for recording and the result of step 303 is No, the recording sheet thus selected by the user is designated (306) and the received image in the selected file is printed out page by page (307 to 308 and to 307). In step 307, the received image is recorded after reduction or after being divided into plural pages as necessary.

As described above, a facsimile apparatus according to the present invention selects one of the recording sheet feeding devices in accordance with the information designating the size of a recording sheet to be used for recording an image received from each transmitting station. Therefore, the user can record an image received from each transmitting station on a recording sheet of such size as desired by the user. Further, in case the received image cannot be recorded in a manner desired by the user, the received image is stored in an image storing unit, and the user is requested to change the recording sheet in the sheet feeding device to a sheet of such size as desired by the user or select one of the recording sheets available in the plotter for printing out. Therefore, the user can record the received image in a sheet of such size as desired by the user.

Figure 12:
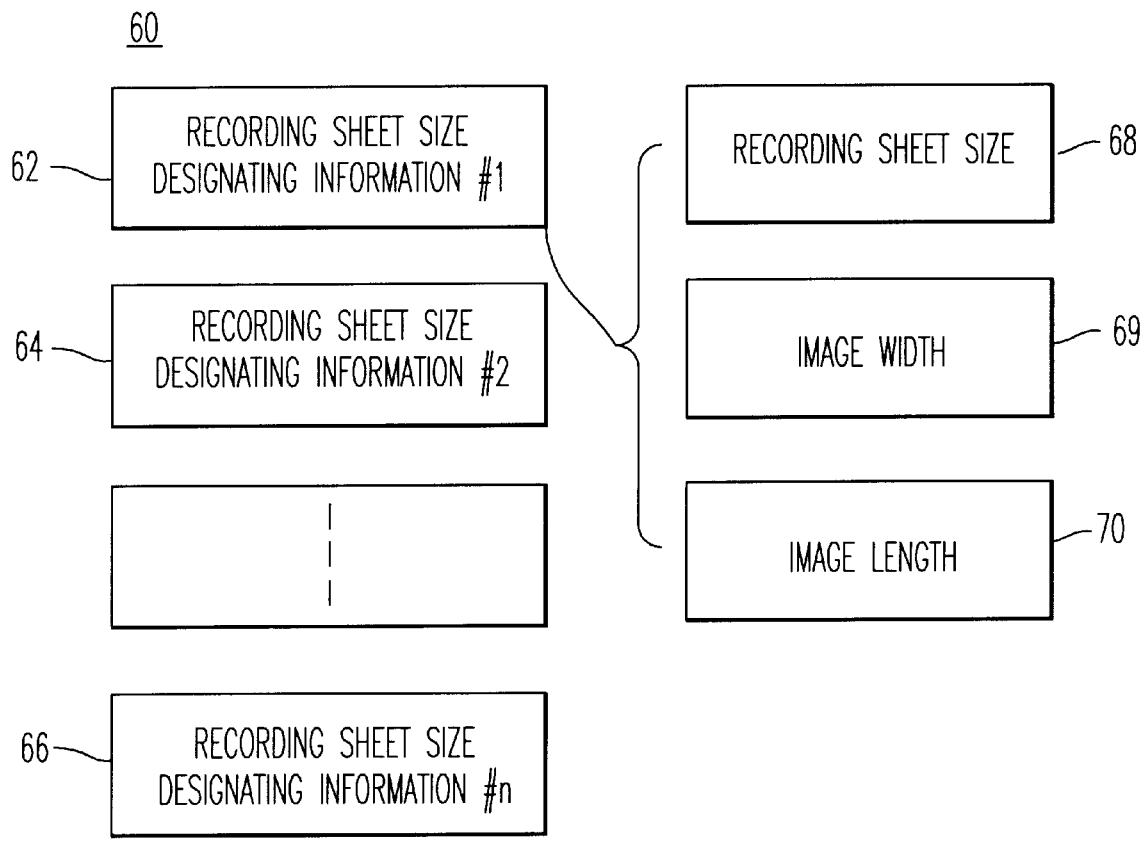
FIG. 12 is a diagram showing an example of an information table specifying the relationship between a width and length of a received image and a size of a recording sheet to be used to record thereupon the received image.

Further, a user can record a received image on a recording sheet of such size as desired by prescribing beforehand the relationship between a size (width and length) of a received image and a size of a recording sheet to be used for recording an image. FIG. 12 is an example of an information table 60 designating the size of a recording sheet to be used for recording each size of an image. Included in each entry 62–66 are a name of a size of a recording sheet (such as A4, B5, B4 and so on) 68, a width 69 and length 70 of an image to be recorded. The content of such information table may be specified and registered by a user through an appropriate operation.

Figure 13:
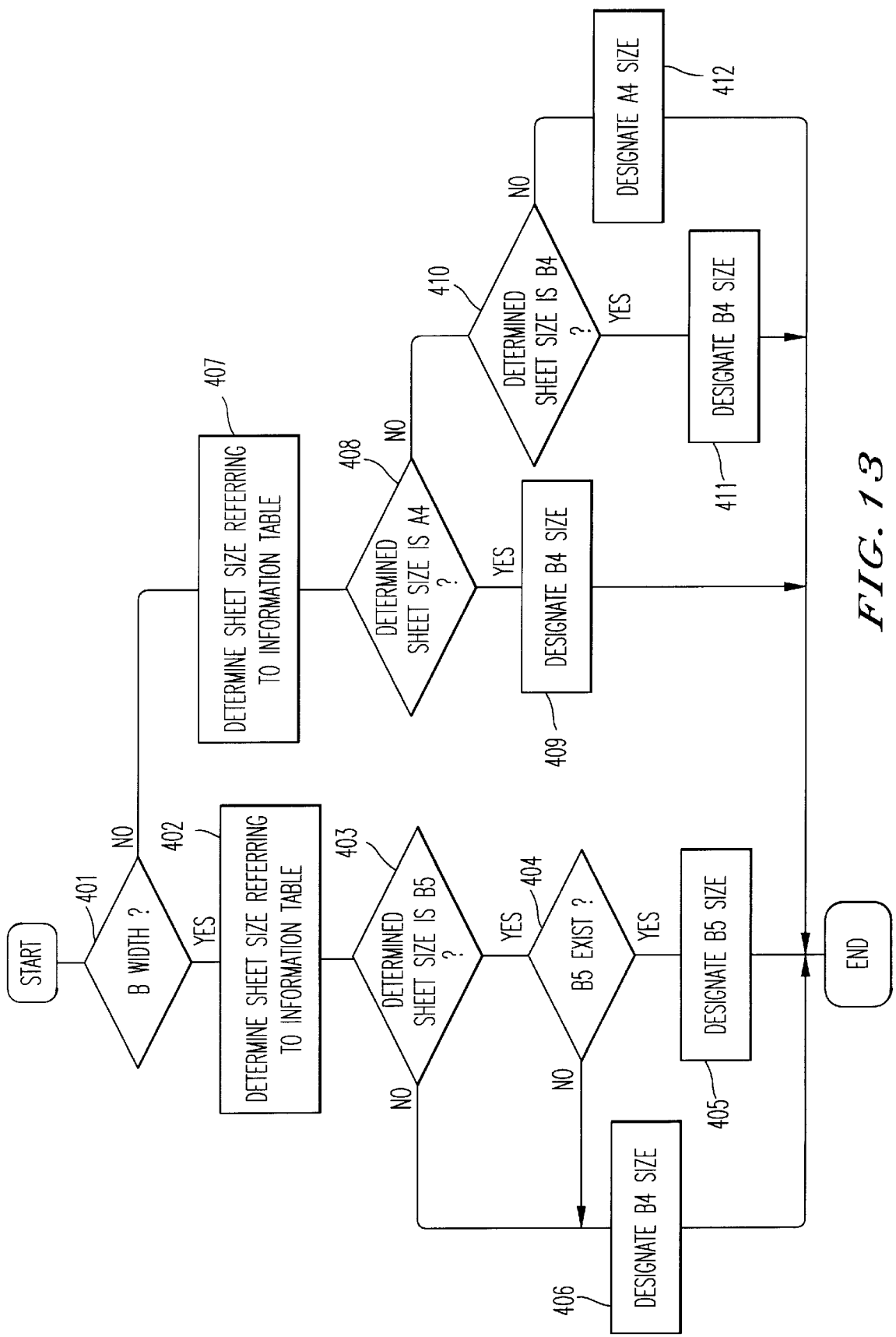
FIG. 13 is a flowchart showing another example of selecting a recording sheet.

FIG. 13 is a flowchart explaining an example of a selection process of a recording sheet in which it is assumed that four kinds of recording sheet designating information are prescribed in the table 60 illustrated in FIG. 12 as follows:

1) sheet size: A4, image width: A, image length: 250–324 mm
2) sheet size: A4, image width: A, image length: 100–200 mm
3) sheet size: B4, image width: A or B, image length: 340–364 mm
4) sheet size: B5, image width: B, image length: 170–200 mm As illustrated in FIG. 13, first it is checked if the width of a received image is a B width (401). If the result of step 401 is YES, the size of a recording sheet is determined based upon the number of lines of the received image referring to the information table (402). Then, it is checked if the determined size is a B5 size (403) and if the result is YES, it is checked if a B5 size cut sheet is in the plotter 5 (404). If the result of step 404 is YES, a B5 size cut sheet is designated as the recording sheet (405). If the result of step 403 is NO or the result of step 404 is NO, a B4 size cut sheet is designated (406). In case the width of the received image is an A4 width (the result of step 401 is NO), the size of a recording sheet is determined based upon the number of lines of the received image referring to the information table (407). It is then checked if the size determined is an A4 size (408) and if the result is YES, an A4 size cut sheet is designated (409). If the result of step 408 is NO, it is checked if the size determined is a B4 size (410). If the result of step 410 is YES, a B4 size cut sheet is designated as the recording sheet (411). If the result of step 410 is NO, an A4 size cut sheet is designated (412). As described above, since a user can specify the relationship between the size of a recording sheet and the size of a received image, the user can record the received image on a sheet of such size as desired by the user.

While the presently preferred embodiments of the present invention have been shown and described as above, it is to be understood that this disclosure is for the purpose of illustration and that various changes and modifications may be made without departing from the scope of the invention as set forth herein. For example, although three sheet feeding devices are provided in the above-mentioned embodiments, it is of course possible to provide more sheet feeding devices. Further, it is possible to employ other types of recording devices, such as a thermal printer, instead of the electrophotographic type image recording device which is employed in the above-mentioned embodiments. Also, although a reduction prohibiting mode and a cut sheet preference mode are prescribed in software in the above-mentioned embodiments, it is of course possible to set such modes by assigning respective switches. Also, the present invention may be adapted to a G4 facsimile apparatus as adapted to a G3 facsimile apparatus.

As described above, since the relationship between a transmitting station and a size of a recording sheet to be used for recording an image can be specified by a user beforehand, it becomes possible to record an image received from each transmitting station in a sheet of such size as desired by the user respectively with a facsimile apparatus according to the present invention. Further, since the relationship between a size of a recording sheet and a size of a received image can be specified by a user beforehand, a received image can be recorded on a sheet of such size as desired by the user respectively also.

The present invention uses one or more microcomputers or control boards to perform the above-described functions. These microcomputers or control boards may be implemented using conventional microprocessors or a conventional general purpose digital computer programmed according to the teachings of the present application, as will be appropriate to those skilled in the art. Appropriate software coding can readily be prepared by skilled programmers based on the teachings of the present disclosure, as will be apparent to those skilled in the software art. The invention may also be implemented by the preparation of applications specific integrated circuits or by interconnecting an appropriate network of conventional component circuits, as will be readily apparent to those skilled in the art.

What is claimed as new and is desired to be secured by Letters Patent of the United States is:

1. A facsimile apparatus, comprising:
    a printing device;
    a cut sheet feeder for feeding a cut sheet to the printing device;
    a rolled sheet feeder for feeding a rolled sheet to the printing device;
    a memory which stores information prescribed by a user designating a size of a recording sheet which is to be used when receiving facsimile images from a specific facsimile machine; and
    control means which controls the facsimile apparatus to detect transmitting station identification information in a protocol processing performed prior to a transmission of a facsimile image, to check if the transmitting station identification information is stored in the memory which stores information prescribed by a user designating a size of a recording sheet which is to be used when receiving facsimile images from a specific facsimile machine, to select one of the cut sheet feeder and the rolled sheet feeder in accordance with the stored information prescribed by the user and stored in the memory when the transmitting station identification information is detected and to feed a sheet from the selected feeder to the printing device to print thereupon the facsimile, and to store the received image in an image memory when the transmitting station identification information is not detected.

2. A facsimile apparatus according to claim 1, wherein the control means selects in accordance with both the stored information prescribed by the user and stored in the memory, and an identification of the specific facsimile machine.

3. A facsimile apparatus according to claim 1, wherein the memory stores information prescribed by a user designating a size of a recording sheet which is to be used when receiving facsimile images from a plurality of specific facsimile machines.

4. A facsimile apparatus according to claim 1, wherein the control means selects in accordance with both the stored information prescribed by the user and stored in the memory, and based upon the length and width of a received image.

5. A facsimile apparatus according to claim 4, further comprising:
    an image memory for storing a received image when a recording sheet of a size prescribed by a user and stored in said memory is unavailable; and
    a display which displays a size of an image stored in said image storing means, and displays a guidance message requesting a user to select between installing a recording sheet for printing thereupon by the printing device the stored image and selecting a recording sheet from among available paper for printing thereupon by the printing device the stored image.

6. A facsimile apparatus according to claim 5, further comprising:
    a sensor which detects the user has installed the recording sheet; and
    an input means for selecting a recording sheet from among the available paper for printing thereupon the stored image.

7. A facsimile apparatus according to claim 1, further comprising:
    an image memory for storing a received image when a recording sheet of a size prescribed by a user and stored in said memory is unavailable; and
    a display which displays a size of an image stored in said image storing means, and displays a guidance message requesting a user to select between installing a recording sheet for printing thereupon by the printing device the stored image and selecting a recording sheet from among available paper for printing thereupon by the printing device the stored image.

8. A facsimile apparatus according to claim 7, further comprising:
    a sensor which detects the user has installed the recording sheet; and
    an input means for selecting a recording sheet from among the available paper for printing thereupon the stored image.

* * * * *